United States Patent
Lemmers, Jr.

(10) Patent No.: US 8,237,298 B2
(45) Date of Patent: Aug. 7, 2012

(54) GENERATOR COUPLING FOR USE WITH GAS TURBINE ENGINE

(75) Inventor: Glenn C. Lemmers, Jr., Loves Park, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 702 days.

(21) Appl. No.: 12/317,284

(22) Filed: Dec. 22, 2008

(65) Prior Publication Data

US 2010/0156113 A1 Jun. 24, 2010

(51) Int. Cl.
*F02C 7/32* (2006.01)

(52) U.S. Cl. ........................................ 290/1 C; 192/66.1

(58) Field of Classification Search ................ 192/66.1; 290/1 C
See application file for complete search history.

(56) References Cited

U.S. PATENT DOCUMENTS

| | | | |
|---|---|---|---|
| 2,186,100 A * | 1/1940 | Doering | 192/55.6 |
| 2,642,970 A | 6/1953 | Szekely | |
| 2,738,210 A * | 3/1956 | Hjembo | 403/335 |
| 4,042,088 A | 8/1977 | Schmohe | |
| 4,167,695 A * | 9/1979 | Phillips | 322/12 |
| 4,734,590 A | 3/1988 | Fluegel | |
| 4,773,518 A | 9/1988 | Raad et al. | |
| 4,915,200 A | 4/1990 | Jacques et al. | |
| 6,082,494 A | 7/2000 | Massicotte | |
| 7,946,403 B2 * | 5/2011 | Burke et al. | 192/90 |
| 2004/0256191 A1 * | 12/2004 | Buckhouse et al. | 192/66.31 |
| 2008/0115608 A1 * | 5/2008 | Birdi et al. | 74/405 |

FOREIGN PATENT DOCUMENTS

| | | | |
|---|---|---|---|
| EP | 2199573 A1 * | 6/2010 | |
| GB | 2017866 A | 10/1979 | |

OTHER PUBLICATIONS

Official Search Report of the European Patent Office in counterpart foreign Application No. 09252866 filed Nov. 3, 2009.

* cited by examiner

*Primary Examiner* — Joseph Waks
(74) *Attorney, Agent, or Firm* — Kinney & Lange, P.A.

(57) ABSTRACT

A generator coupling assembly includes an output housing, an output member rotationally supported by the output housing, a generator powered by the output member, and a clutch adapter. The generator includes a generator stator, a generator rotor rotatably supported within the generator stator, a shaft coupled to the generator rotor, and a clutch member arranged on the shaft. The clutch adapter is coupled to and radially retained by the output member, and includes a clutching structure configured for selective engagement with the clutch member to engage the clutch member and the clutch adapter for co-rotation.

18 Claims, 4 Drawing Sheets

GENERATOR COUPLING FOR USE WITH GAS TURBINE ENGINE

BACKGROUND

The present invention relates to generator systems, and more particularly to mechanical couplings for generator systems.

Gas turbine engines, such as those used for aerospace applications, often power a generator that generates electricity. The generator used for aerospace applications is typically mounted to an accessory gearbox, which is in turn mechanically coupled to a driven shaft of the gas turbine engine. For most aerospace applications, the generator is configured to allow disconnection from the driven shaft of the gas turbine engine, which provides safety benefits.

A typical prior art generator system includes a generator rotor and generator stator, a drive shaft engaged with the generator rotor, and an input shaft. In this configuration, the input shaft is a part of the generator assembly, such that removal of the generator from the accessory gearbox removes the input shaft along with all the other generator components. The generator rotor is supported by first and second sets of bearings, and the drive shaft is splined to the generator rotor. The input shaft is supported by a third bearing. One end of the input shaft is normally engaged with the drive shaft, but can be disengaged from the drive shaft by a clutch in order to disengage the generator. Another end of the input shaft is splined for engagement with the accessory gearbox, which provides a rotational input to power the generator. When the input shaft is disengaged from the drive shaft by the clutch, the input shaft remains engaged to and powered by the accessory gearbox, which causes rotation of the third set of bearings. The third bearing is sealed within the generator.

In the prior art configuration described above, oil scavenging and supply is generally provided within the generator. Upon disengagement of the drive shaft by the clutch, oil scavenging and supply within the generator ceases. This generally presents little concern to most components of the generator, as the generator is not operating to generate electricity and components like the first and second sets of bearings do not experience rotation. However, when the generator is disengaged by the clutch, the third set of bearings and the input shaft will continue to rotate, but will generally lack lubrication. This requires special design of the third set of bearings to permit operation without lubrication for a suitable length of time.

It is desired to provide a generator system with a mechanical coupling that reduces or eliminates design constraints for operation of the generator without lubrication.

SUMMARY

A generator coupling assembly according to the present invention includes an output housing, an output member rotationally supported by the output housing, a generator powered by the output member, and a clutch adapter. The generator includes a generator stator, a generator rotor rotatably supported adjacent to the generator stator, a shaft coupled to the generator rotor, and a clutch member arranged on the shaft. The clutch adapter is coupled to and radially retained by the output member, and includes a clutching structure configured for selective engagement with the clutch member to engage the clutch member and the clutch adapter for co-rotation.

DETAILED DESCRIPTION

In general, the present invention provides a generator system powered by a prime mover (e.g., a gas turbine engine) configured to rotate an output member. The generator includes a housing, a generator stator, a generator rotor rotatably supported on the housing by bearings and positioned adjacent to the generator stator, a drive shaft rotatably coupled to and radially supported by the generator rotor, and a clutch member arranged on the shaft. Further, a clutch adapter is rotationally coupled to the output member; the clutch adapter includes a clutching structure configured for selective rotational engagement with the clutch member arranged on the drive shaft. The clutch adapter is radially retained by the output member. This configuration allows the clutch adapter to be supported by the output member, which can reduce the number of bearing sets required by the system, and can eliminate the need for a bearing set that operates without lubrication when the generator is disengaged. The clutch adapter can be a component readily separable from components held within the generator housing, such that the clutch adapter can be mounted to the output member independent of the generator. The prime mover (and/or any associated gearbox) is sealed, such that the prime mover/gearbox remains sealed when the generator is removed.

Figure 1:
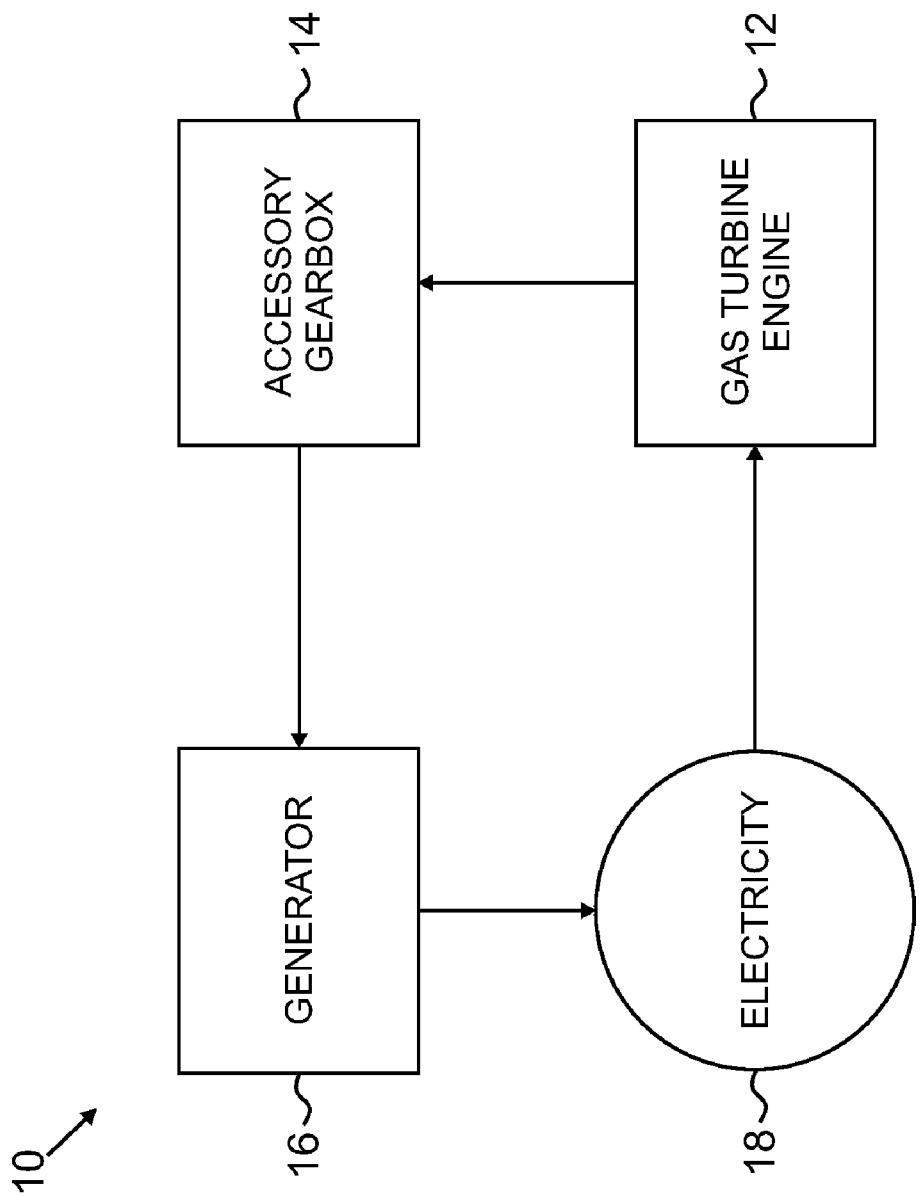
FIG. 1 is a block diagram of a generator system.

FIG. 1 is a block diagram of a generator system 10. It should be noted that the system 10 shown in FIG. 1 is simplified, and is provided merely by way of example and not limitation. Numerous other configurations are possible in accordance with the present invention. The illustrated generator system 10 includes a gas turbine engine (or other prime mover) 12, an accessory gearbox 14 driven by the gas turbine engine 12, and a generator 16 configured to receive rotational force from the accessory gearbox 14. Operation of the generator 16 produces electricity 18, which is supplied to the gas turbine engine 12 or to other locations as desired.

Figure 2:
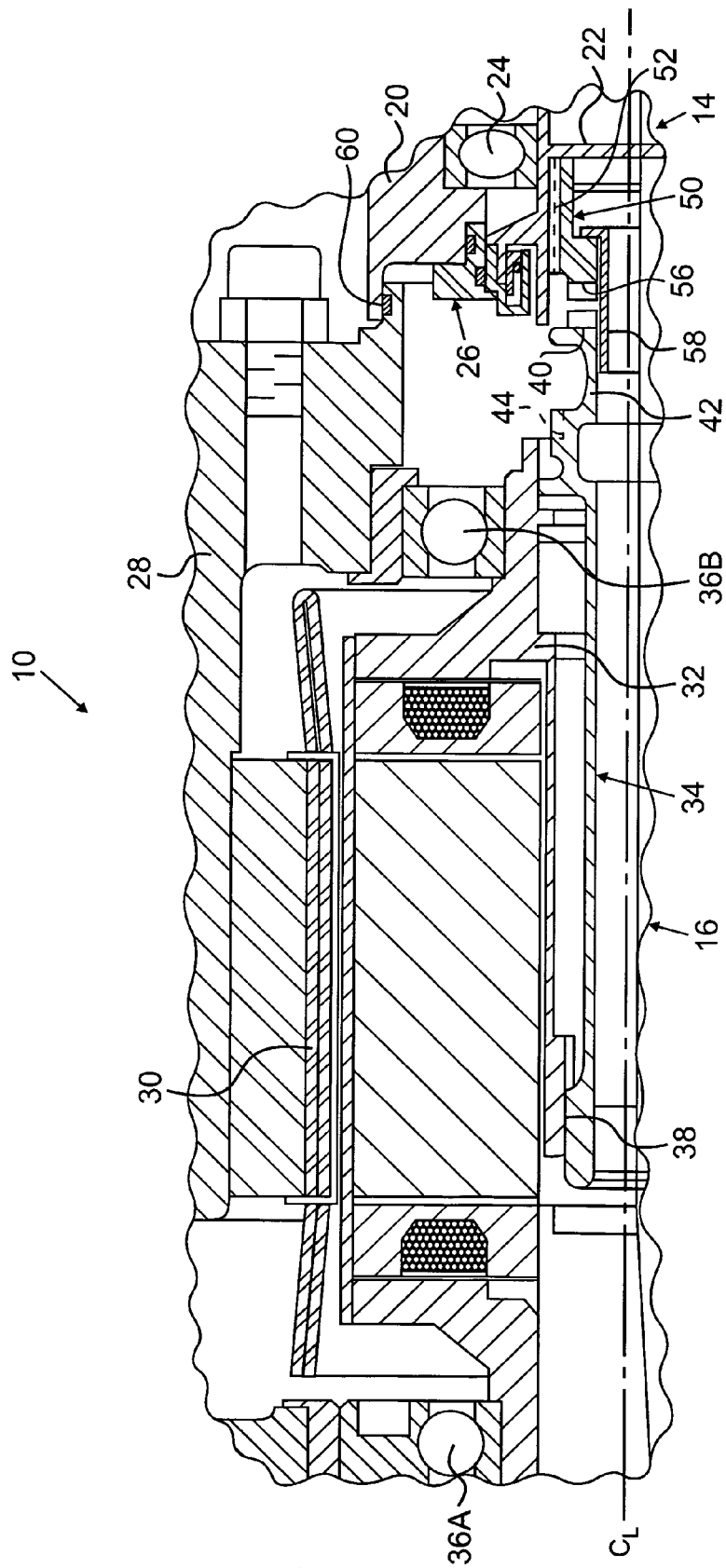
FIG. 2 is a partial cross-sectional view of one embodiment of the generator system according to the present invention.

FIG. 2 is a partial cross-sectional view of one embodiment of the generator system 10. As shown in FIG. 2, the accessory gearbox 14 includes a gearbox housing 20 (which is a type of output housing), an output member 22 (e.g., a gearbox drivetrain), and a bearing set 24. The gearbox housing 20 is rotationally fixed, with the output member 22 rotatably supported on the housing 20 by the bearing set 24. The output member 22 is configured to rotate in response to a rotational force output from the gas turbine engine 12 (see FIG. 1). A seal 26 (also called a gearbox seal) is positioned to create a fluidic seal between the gearbox housing 20 and the output member 22. The seal 26 can be a carbon-based face seal, such as a Cartriseal® mechanical face seal, available from Rexnord Industries, LLC, Milwaukee, Wis.

The generator 16 includes a generator housing 28, a stator 30, a rotor 32, a drive shaft 34, and bearing sets 36A and 36B. As shown in FIG. 2, the generator 16 is in a disengaged condition. The generator housing 28 is rotationally fixed, and the rotor 32 rotatably supported within the generator housing 28 by the bearing sets 36A and 36B for rotation about a centerline axis $C_L$. The stator 30 is attached to the generator housing 28. The rotor 32 is positioned coaxially within the stator 30, and relative movement between the rotor 32 and the stator 30 generates electricity 18 in a conventional manner. The drive shaft 34 is positioned concentric with the rotor 32 for rotation about the centerline axis $C_L$, with at least a portion of the drive shaft 34 positioned radially inside the rotor 32. The drive shaft 34 is radially supported by the rotor 32, and is coupled to the rotor 32 for co-rotation. The drive shaft 34 and the rotor 32 are rotationally coupled with a splined connection 38 that permits axial movement of the drive shaft 34.

The drive shaft 34 of the generator 16 has a generally elongate, tubular configuration, with the splined connection 38 located at one end and a clutch member 40 arranged on an opposite end. The clutch member 40 can be integrally formed with the drive shaft 34 as shown, or alternatively can be a separate structure attached to the drive shaft 34. The configuration and operation of the clutch member 40 will be explained further below. The drive shaft 34 includes a shear section 42 provided between the splined connection 38 and the clutch member 40. In the illustrated embodiment, the shear section 42 is located directly adjacent to the clutch member 40. The shear section 42 allows sacrificial failure of the drive shaft 24 at a chosen location, when the drive shaft is under torque loads beyond a given threshold. The drive shaft 34 can further include an actuator engagement means 44 (e.g., one or more threads) configured to work with a conventional actuator (not shown) to enable selective axial movement of the drive shaft 34.

It should be noted that the illustrated embodiment of the generator 16 is provided by way of example and not limitation. Numerous other generator configurations are possible. Moreover, the generator 16 can include additional components not specifically shown, such as rectifiers, lubrication subsystems, magnetic assemblies, etc.

A clutch adapter 50 is radially supported by the output member 22, and is coupled to the output member 22 for co-rotation about the centerline axis $C_L$. In the illustrated embodiment, the clutch adapter 50 is a sleeve-like member arranged concentrically with the output member 22, and is at least partially positioned radially inside the output member 22. A splined connection 52 is provided to rotationally couple the clutch adapter 50 and the output member 22. A retaining ring 54 (e.g., a split ring retainer) is provided to axially secure the clutch adapter to the output member 22. The clutch adapter 50 includes a clutching structure 56 positioned to face the clutch member 40 arranged on the drive shaft 34 of the generator 16. The clutching structure 56 can be integrally formed with the clutch adapter 50 as shown, or can be a separate structure attached to the clutch adapter 50 in alternative embodiments. The inclusion of the clutch adapter 50 as a separate part, rather than forming the clutching structure directly on the output member 22, helps reduce a risk of damage to relatively expensive and difficult to replace parts of the accessory gearbox 14.

A support member 58 is also provided that extends from the clutch adapter 50 into a hollow portion of the drive shaft 34 at or near the shear section 42. In the illustrated embodiment, the support member 58 is generally cylindrical in shape, and is radially and axially supported by the clutch adapter 50. A small radial gap is provided between the support member 58 and the drive shaft 34 to prevent contact between those parts during normal operation of the generator 16 (whether engaged or disengaged). In the event of failure of the shaft at the shear section 42, the support member 58 can radially support and retain the liberated portion of the drive shaft 34, including the clutch member 42, which can help prevent liberated components from moving about and potentially contacting and damaging other components of the generator 16.

Additionally, a seal member 60 is positioned to create a seal between the gearbox housing 20 and the generator housing 28. In the illustrated embodiment, the seal member 60 is a conventional O-ring seal arranged between overlapping, axially-extending portions of the gearbox housing 20 and the generator housing 28. The seal member 60 can be located radially outward from the seal 26.

Installation of the generator 16 to the accessory gearbox 14 can include first installing the clutch adapter 50, the support member 58, and the seal 26 to the accessory gearbox 14, specifically relative to the gearbox housing 20 and the output member 22. Then the generator can be installed, allowing a mechanical engagement between the accessory gearbox 14, the clutch adapter 50 and the generator 16. The generator 16 can be removed from the accessory gearbox 14 without removing the clutch adapter 50.

Figure 3:
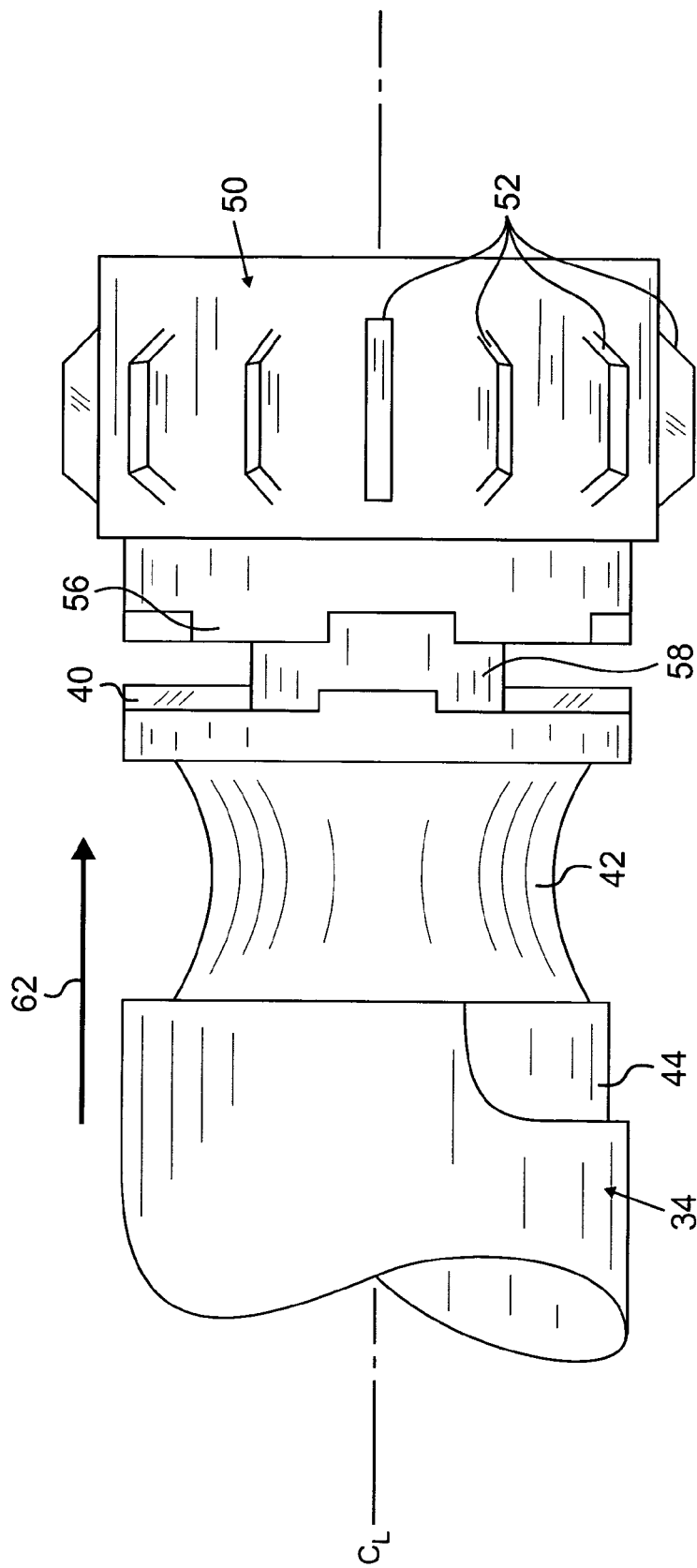
FIG. 3 is a front elevation view of a portion of the generator system of FIG. 2, illustrating a clutch assembly.

FIG. 3 is a front elevation view of a portion of the generator system 10, including part of the drive shaft 34, the clutch adapter 50, and the support member 58. As shown in FIG. 3, the clutch member 40 and the clutching structure 56 form a clutch that allows selective engagement and disengagement of the drive shaft 34 and the clutch adapter 50. The clutch is shown in a disengaged position in FIG. 3. In the illustrated embodiment, the clutch is a mechanical face clutch with the clutch member 40 and the clutching structure 56 each defining circumferentially-spaced toothed (e.g., "dog tooth") members that can create a mechanical interference engagement to transmit rotational force. In alternative embodiments, other types of clutches can be utilized.

The drive shaft 34 can be biased into an engaged position by default. Axial movement of the dive shaft 34 in the direction designated by arrow 62 can move the clutch member 40 into engagement with the clutching structure 56. As previously mentioned, a conventional actuator (not shown) can be used to move the drive shaft 34 to a disengaged position. For instance, where the engagement means 44 comprise a threaded structure, the actuator can move radially into contact with the engagement means 44 when the drive shaft 34 is rotating to cause the drive shaft 34 to axially translate to a disengaged position (as shown in FIGS. 2 and 3) due to contact between the actuator and a thread of the engagement means 44. In the disengaged condition, the clutch adapter 50 continues to rotate at a speed of the output member 22 of the gearbox 14 (see FIG. 2), though the clutch prevents rotational force from being transmitted from the clutch adapter 50 to the drive shaft 34 of the generator 16.

Figure 4:
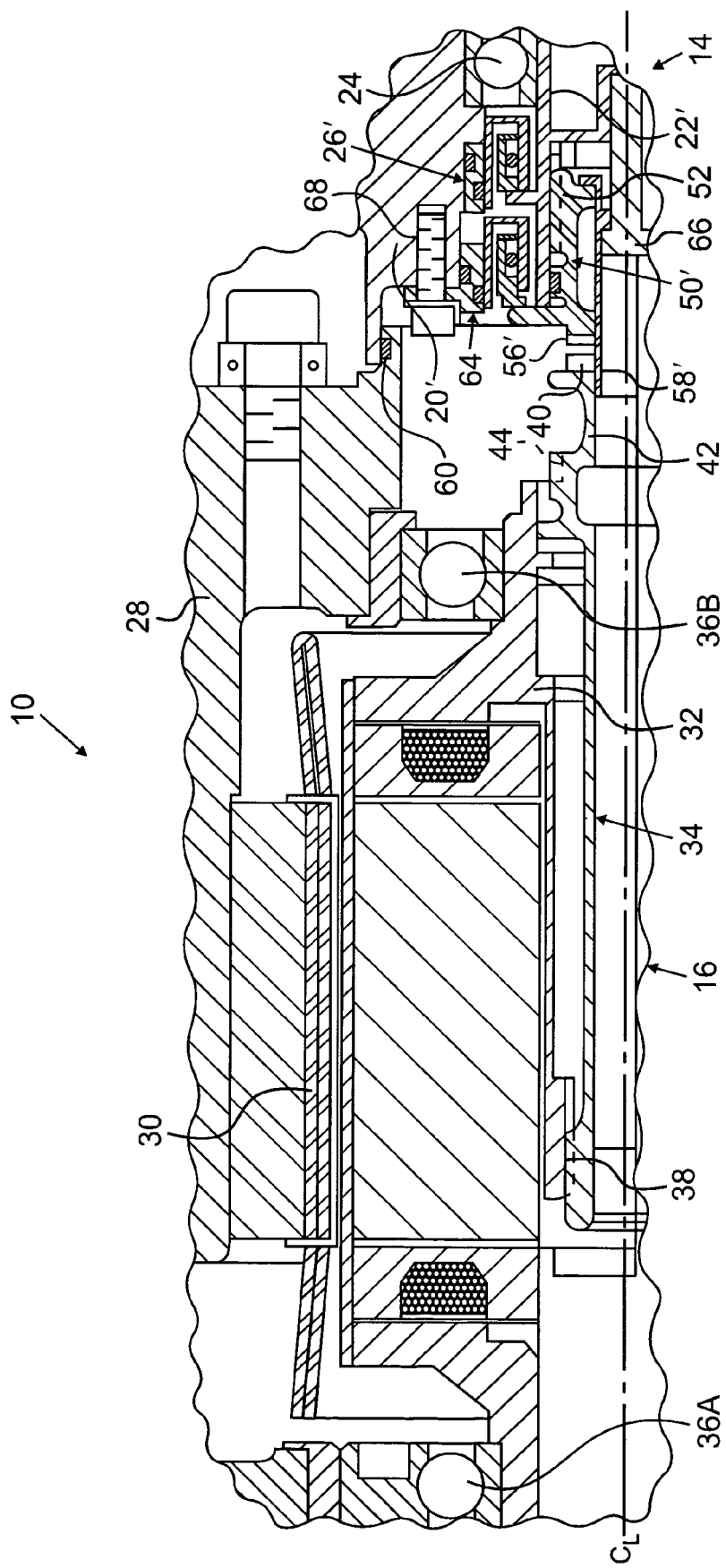
FIG. 4 is a partial cross-sectional view of another embodiment of the generator system according to the present invention

Numerous alternative embodiments of the present invention are possible. FIG. 4 is a partial cross-sectional view of another embodiment of the generator system 10. In the embodiment shown in FIG. 4, the generator 16 can be substantially identical to that described above with respect to the embodiment shown in FIG. 2. However, configurations of a gearbox housing 20' (which is a type of output housing), an output member 22' of the accessory gearbox 14, a seal 26', a clutch adapter 50' and a support member 58' as shown in FIG. 4 differ from the corresponding components of the embodiment of FIG. 2. Moreover, an additional seal 64 (also called an input seal) can be provided.

In the embodiment illustrated in FIG. 4, the output member 22' and the support member 58' are configured to be secured together with a fastener 66 (e.g., a splined pin, screw, bolt, etc.). The seal 26' is positioned close to the bearing set 24. The additional seal 64 is positioned to create a fluidic seal between the gearbox housing 20' and the clutch adapter 50'. The seal 64 is secured to the gearbox housing 20' with a suitable fastener 68. In this configuration, additional sealing at a gap between the clutch adapter 50' and the gearbox housing 20' is provided, while the seal 26' remains in place to fluidically seal a gap between the gearbox housing 20 and the output member 22' even when the generator 16, the seal 64, and the clutch adapter 50' are removed.

It will be recognized that the present invention provides numerous advantages and benefits. For example, a generator system according to the present invention utilizing a clutch adapter can eliminate the need for an input shaft bearing set, and can reduce the need to operate a bearing set without lubrication when a generator and associated lubrication subsystem are disengaged. The present invention also utilizes a relatively small numbers of seals, which allows for effective sealing without added excessive mass and complexity to the system.

Although the present invention has been described with reference to preferred embodiments, workers skilled in the art will recognize that changes may be made in form and detail without departing from the spirit and scope of the invention. For instance, the present invention can be used to couple a generator to a prime mover of a type other than a gas turbine engine.

The invention claimed is:

1. A generator coupling assembly comprising:
    an output housing;
    an output member rotatably supported by the output housing;
    a generator powered by the output member, the generator comprising:
        a generator stator;
        a generator rotor rotatably supported within the generator stator;
        a shaft coupled to the generator rotor for co-rotation therewith; and
        a clutch member arranged on the shaft; and
    a clutch adapter coupled to the output member with a splined connection for co-rotation therewith, wherein the clutch adapter includes a clutching structure configured for selective engagement with the clutch member to engage the clutch member and the clutch adapter for co-rotation, and wherein the clutch adapter is radially retained by the output member.

2. The assembly of claim 1, wherein the shaft is configured to axially translate to selectively engage the clutch member and the clutch adapter.

3. The assembly of claim 1, wherein the clutch member comprises a first toothed clutch face located at a first end of the shaft, and wherein the clutching structure of the clutch adapter comprises a second toothed clutch face.

4. The assembly of claim 3, wherein the first toothed clutch face is integrally formed with the shaft.

5. The assembly of claim 1, the shaft further comprising:
    a shear section configured to facilitate shaft failure under excessive torque conditions to disengage the generator.

6. The assembly of claim 5 and further comprising:
    a support member extending from the clutch adapter into a hollow region of the shaft at or near the shear section to radially retain a portion of the shaft upon shaft failure.

7. The assembly of claim 1, wherein the output housing comprises a gearbox housing, and wherein the output member comprises a gearbox power shaft.

8. The assembly of claim 1 and further comprising:
    a seal member configured to create a fluid seal between the output housing and the output member.

9. The assembly of claim 1 and further comprising:
    a seal member configured to create a fluid seal between the output housing and the output member, wherein the seal member maintains a fluid seal between the output housing and the output member when the generator and the clutch adapter are uninstalled from the output member.

10. The assembly of claim 1, wherein the generator further comprises a generator housing, the assembly further comprising:
    a seal member configured to create a fluid seal between the output housing and the generator housing.

11. A generator system comprising:
    a prime mover for providing a rotational force;
    a gearbox comprising:
        a gearbox housing; and
        an output member rotationally supported by the gearbox housing for transmitting rotational force from the prime mover;
    a generator powered by the output member, the generator comprising:
        a generator housing;
        a generator stator;
        a generator rotor rotatably supported within the generator stator;
        a shaft coupled to the generator rotor for co-rotation therewith; and
        a clutch member arranged on the shaft; and
    a clutch adapter coupled to the output member of the gearbox with a splined connection for co-rotation therewith, wherein the clutch adapter includes a clutching structure configured for selective engagement with the clutch member to engage the clutch member and the clutch adapter for co-rotation, and wherein the clutch adapter is radially retained by the output member.

12. The system of claim 11, wherein the prime mover comprises a gas turbine engine.

13. The system of claim 11, wherein the shaft is configured to axially translate to selectively engage the clutch member and the clutch adapter.

14. The system of claim 11, wherein the clutch member comprises a first toothed clutch face located at a first end of the shaft, and wherein the clutching structure of the clutch adapter comprises a second toothed clutch face.

15. The system of claim 11, the shaft further comprising:
    a shear section configured to facilitate shaft failure under excessive torque conditions to disengage the generator; and
    a support member extending from the clutch adapter into a hollow region of the shaft at or near the shear section to radially retain a portion of the shaft upon shaft failure.

16. The system of claim 11 and further comprising:
    a seal member configured to create a fluid seal between the gearbox housing and the output member.

17. The system of claim 11 and further comprising:
    a seal member configured to create a fluid seal between the output housing and the output member, wherein the seal member maintains a fluid seal between the output housing and the output member when the generator and the clutch adapter are uninstalled from the output member.

18. The system of claim 11, wherein the generator further comprises a generator housing, the assembly further comprising:
    a seal member configured to create a fluid seal between the output housing and the generator housing.

* * * * *